United States Patent
Dörfler et al.

(10) Patent No.: US 12,122,273 B2
(45) Date of Patent: Oct. 22, 2024

(54) AIR CUSHION ARRANGEMENT

(71) Applicant: Alfmeier Präzision SE, Treuchtlingen (DE)

(72) Inventors: Erich Dörfler, Landsberg (DE); Helmut Auernhammer, Höttingen (DE); Ronny Gehlmann, Allersberg (DE); Jürgen Baumgartl, Treuchtlingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 99 days.

(21) Appl. No.: 17/741,901

(22) Filed: May 11, 2022

(65) Prior Publication Data

US 2022/0363172 A1    Nov. 17, 2022

(30) Foreign Application Priority Data

May 14, 2021   (DE) ..................... 10 2021 112 538.3

(51) Int. Cl.
*B60N 2/90*        (2018.01)
*A61H 9/00*        (2006.01)
(Continued)

(52) U.S. Cl.
CPC ........... *B60N 2/525* (2013.01); *A61H 9/0007* (2013.01); *B60N 2/22* (2013.01); *B60N 2/976* (2018.02); *B60N 2002/981* (2018.02)

(58) Field of Classification Search
CPC .............. B60N 2/976; B60N 2002/981; A61H 9/0078; A61H 9/0007
See application file for complete search history.

(56) References Cited

U.S. PATENT DOCUMENTS

| | | | |
|---|---|---|---|
| 5,135,282 A | 8/1992 | Pappers | |
| 6,212,719 B1 * | 4/2001 | Thomas | A47C 27/081 601/149 |

(Continued)

FOREIGN PATENT DOCUMENTS

| | | |
|---|---|---|
| CN | 2596979 Y | 1/2004 |
| CN | 2708885 Y | 7/2005 |

(Continued)

OTHER PUBLICATIONS

Office Action for Chinese Application No. 202210529645.9, dated Nov. 9, 2023, with English Translation.

(Continued)

*Primary Examiner* — Timothy J Brindley
(74) *Attorney, Agent, or Firm* — JK Intellectual Property Law, PA

(57) ABSTRACT

An air cushion arrangement installable in an interior of a seat having a seat surface may have at least one air cushion and an air supply system for variably supplying the at least one air cushion with air, wherein at least one air cushion is assigned a pulsation generator, the at least one air cushion being non-fluidically connected to the pulsation generator. The air cushion and the pulsation generator are configured to generate a pulsation in a direction of the seat surface of the seat (e.g., if the air cushion arrangement were installed in the interior of the seat). A seat assembly including such an air cushion arrangement is also disclosed.

14 Claims, 6 Drawing Sheets

(51) Int. Cl.
  *B60N 2/22*  (2006.01)
  *B60N 2/52*  (2006.01)

(56) References Cited

U.S. PATENT DOCUMENTS

| | | | |
|---|---|---|---|
| 10,945,911 B2* | 3/2021 | Perriard | A61H 9/005 |
| 11,679,047 B2* | 6/2023 | Wijesundara | A61G 7/05776 |
| | | | 5/713 |
| 2003/0038517 A1 | 2/2003 | Moran et al. | |
| 2006/0085919 A1* | 4/2006 | Kramer | A61G 7/05776 |
| | | | 5/713 |
| 2009/0227914 A1* | 9/2009 | Kanaoka | A61H 9/0078 |
| | | | 601/84 |
| 2016/0296413 A1* | 10/2016 | Norman | B60N 2/976 |
| 2018/0014995 A1* | 1/2018 | Gensch | A61H 9/0085 |
| 2018/0147964 A1* | 5/2018 | Ogiso | A61H 9/0078 |
| 2018/0272902 A1 | 9/2018 | Lem et al. | |
| 2020/0368092 A1 | 11/2020 | Dörfler et al. | |
| 2023/0382283 A1* | 11/2023 | Dörfler | B60N 2/976 |

FOREIGN PATENT DOCUMENTS

| | | | | |
|---|---|---|---|---|
| CN | 208715042 U | | 4/2019 | |
| CN | 11973433 A | | 11/2020 | |
| CN | 212382934 U | | 1/2021 | |
| CN | 112896002 A | * | 6/2021 | ............. B60N 2/665 |
| DE | 102011079712 A1 | | 1/2013 | |
| DE | 102017214313 A1 | * | 2/2019 | ........... B60N 2/5685 |
| DE | 202019100400 U1 | | 3/2020 | |
| DE | 102019113629 A1 | | 11/2020 | |
| EP | 4122759 A1 | * | 1/2023 | ............... B60N 2/64 |
| JP | 2018103655 A | * | 7/2018 | |
| KR | 20230002131 U | * | 11/2023 | |
| TW | 471315 U | | 1/2002 | |
| TW | 258727 U | | 3/2005 | |

OTHER PUBLICATIONS

German Office Action for DE 10 2021 112 538.3, pdated Jan. 19, 2022, with English translation.

* cited by examiner

AIR CUSHION ARRANGEMENT

CROSS-REFERENCE TO RELATED APPLICATIONS

This application claims benefit to German Patent Application Number 10 2021 112 538.3, dated May 14, 2021, which is incorporated in its entirety by reference herein.

TECHNICAL FIELD

The present disclosure relates to an air cushion arrangement for a seat, such as a vehicle seat.

BACKGROUND

Air cushion arrangements for seats are generally known from the prior art.

These are used to realize or support additional functions, such as massage functions, or even assistance systems which can alert the occupant to events. For this purpose, a number of air cushions can be arranged in the backrest of a seat, which can be supplied with air together or independently of each other to effect the desired function. In this sense, the air cushions, in particular changing pressure conditions in the air cushions, cause a pressure change or force effect acting through the seat surface (including the surface on which the occupant sits and/or the backrest of the seat) that can be felt by the occupant.

Thus, from DE 10 2019 113 629 A1, for example, a massage device for a seat is known in which an air cushion is supplied with air via an air supply system. In order to generate additional vibrations within the air cushion, a vibration generating device fluidically connected to the air cushion is provided, which applies a pressure oscillation on the air cushion via the lines provided by the air supply system. This makes it possible to generate a (higher-frequency) oscillation or pulsation in the air cushions in addition to letting air in and out of the individual air cushions, which can have a preferred effect on the massage function, for example.

While the aimed function can be realized with this system, it is necessary here to move a large volume of air, and at the same time there is a certain latency between the movement of the oscillation generating device and the resulting pressure effect in the air cushion. Both can adversely affect the targeted control of pulsation.

Based on known prior art, the technical problem to be solved includes providing an air cushion arrangement that allows improved control of the pulsation generated.

SUMMARY

This problem is solved by the air cushion arrangement for a seat according to aspects of the following disclosure.

In some respects, the air cushion arrangement according to the disclosure for a seat, such as a vehicle seat, comprises at least one air cushion and an air supply system for variable supply of air to the air cushion or air cushions of the air cushion arrangement, wherein at least one air cushion of the air cushion arrangement is assigned a pulsation generator, which is non-fluidically connected to the air cushion, wherein the air cushion and the pulsation generator assigned to the air cushion are configured to generate a pulsation in the direction of a seat surface of the seat in the installed state of the air cushion arrangement in a seat.

The air cushion or air cushions may have an air cushion cover, for example in the form of a flexible membrane, which can be manipulated in terms of shape and/or volume, for example by supplying air to the air cushion via the air supply system.

In the context of the disclosure, the non-fluidic connection of the pulsation generator to the air cushion means that the pulsation generator is not indirectly connected to the air cushion via, for example, a line of the air supply system, but can directly, for example mechanically or electromagnetically, transmit the pulsation generated by the pulsation generator to the air cushion or, in interaction with the air cushion, can transmit the pulsation directly to a seat surface.

In particular, a direct mechanical connection such that at least a part of the pulsation generator is firmly connected to at least a part of the air cushion, and here in particular to the air cushion cover of the air cushion, can be understood as a non-fluidic connection.

The non-fluidic connection of the air cushion to its assigned pulsation generator can reduce losses in the transmission of pulsation from the pulsation generator to the air cushion, and direct generation of pulsation by the pulsation generator in the direction of the seat surface, where appropriate in interaction with or mediated by the air cushion, is thus achieved, which can also lead to energy savings in the operation of the air cushion arrangement.

In principle, the pulsations generated by the pulsation generator can have a frequency of 1 Hz to 1,000 Hz, wherein a frequency range of 3 Hz to 100 Hz, in particular 60 Hz to 80 Hz, or between 5 Hz and 20 Hz, in particular between 5 Hz and 15 Hz, and especially preferably between 7 Hz and 12 Hz, can be preferred. These frequency ranges have proven to be preferred, especially for the realization of massage functions, as they are perceived as pleasant by the occupant. At the same time, pulsation generators are available at low cost in this frequency range.

It may further be provided that the pulsation generator comprises a pulsation generator body, an element movable relative to the pulsation generator body, and an oscillation generator, wherein the movable element may be moved electromagnetically or mechanically relative to the pulsation generator body by the oscillation generator.

Preferably, the pulsation generator body may be fixedly connected to the seat when the air cushion arrangement is installed so that it is not movable relative to the seat. Alternatively or additionally, the pulsation generator body may be fixedly connected to the air cushion itself or to a part of the air cushion. In this way, the pulsation generator body serves as a fixed point relative to which the movable element can be moved by the oscillation generator, such as an electric motor drive or the like. In this context, the pulsation generator body may have a larger mass (for example, twice as large) or, in some embodiments, a substantially larger mass (for example, five times as large or ten times as large) than the movable element, such that the inertia of the pulsation generator body may advantageously help to translate the force effect transmitted from the oscillation generator to the movable element into a movement of the movable element itself.

The fact that the movable element is moved mechanically with respect to the pulsation generator body by the oscillation generator includes, in particular, mechanical drive means which cause a movement of the movable element due to a mechanical connection between the oscillation generator and the movable element. In contrast, the electromagnetic movement of the movable element by the oscillation generator is to be understood such that a transmission of the force exerted by the oscillation generator on the movable element is not or not only effected by mechanical means, but (also) by electromagnetic means.

In particular, the movable element may, for example, be or comprise a magnetic element (for example, a ring of magnetic/magnetizable material or layers of magnetic/magnetizable material incorporated into the air cushion cover) and the oscillation generator may be configured as a coil to which current may be alternately supplied to cause movement of the movable element so that movement of the movable element occurs due to the electromagnetic forces acting on the movable element. By changing the current flow through the coil, the forces acting on the movable element can then be changed periodically, for example, to generate pulsation.

Both variants for generating the movement of the movable element allow a specific control of the movement and thus generation of the pulsation. The electromagnetic movement of the movable element by the oscillation generator can thereby in some embodiments advantageously achieve a higher frequency of pulsation than the mechanical one, whereas, for example, in some embodiments stronger pulsations can be caused with the mechanical movement of the movable element.

In one embodiment, the movable element and the pulsation generator body are each mechanically connected to the air cushion. This embodiment is particularly suitable for effecting a transfer of pulsation from the pulsation generator to the air cushion, which can then be transferred towards a seat surface (when the air cushion arrangement is installed). Any risk of damage that would be associated with an arrangement of the pulsation generator between the seat surface and the air cushion can thus be avoided.

It can also be provided that an interior of the pulsation generator body, in which the movable element is arranged, is separated from the interior of the air cushion by a membrane and the movable element is connected to the membrane. This embodiment ensures reliable contact between the pulsation generator and, in particular, the movable element and the air cushion, irrespective of the pressure level inside the air cushion, so that the pulsation can be reliably transmitted to the air cushion.

In a further development of this embodiment, it is provided that the air cushion arrangement comprises two air cushions and two pulsation generators, wherein one pulsation generator is assigned to each air cushion and wherein the interiors of the pulsation generator bodies of the pulsation generators are fluidically connected via a connecting line. The fluidic connection of the interiors here comprises in particular a connection such that a gas exchange between the interiors is possible. Particularly preferred here are embodiments in which the pulsation generators alternately apply pulsation to the air cushions, so that when one of the pulsation generators causes the pressure in its assigned air cushion to increase, the other pulsation generator reduces the pressure exerted on its assigned air cushion by the movable element. Due to the fluidic connection between the interiors of the pulsation generator bodies, a part of the necessary force for pulsation can be effected here by pressure equalization in the interiors of the pulsation generator bodies, which can advantageously reduce the energy required for generating pulsation in the air cushions.

Furthermore, the interior of at least one pulsation generator body can be connected to the interior of the air cushion assigned the pulsation generator via a pressure equalization line, and pressure equalization between an interior of the air cushion and the interior of the pulsation generator body can be effected via the pressure equalization line, wherein optionally the pressure equalization line comprises a lockable pressure equalization valve or is formed by the lockable pressure equalization valve. With this configuration, the energy required to generate the pulsation can also be reduced. It is preferred if the pressure equalization line or the pressure equalization valve realizes a pressure equalization delayed to the pressure change caused by the pulsation in the air cushion.

The membrane may be an air cushion cover of the air cushion. For example, the membrane can be merely the continuous continuation of the air cover of the air cushion also in the region connected to the pulsation generator. Alternatively, the membrane may be made of approximately the same material as the air cushion cover, but may be configured to be more flexible, such as due to a thinner material thickness compared to the rest of the air cushion cover. In alternative embodiments thereto, the membrane may be made of or comprise a different material than the rest of the air cushion cover. For example, the membrane may be a silicone membrane or comprise silicone, while the remainder of the air cover may comprise a flexible material that need not be identical to the material of the membrane. For example, the flexible material may be or comprise a cover of fabric fibers. Additionally or alternatively, the air cushion cover may be or comprise a plastic or fiber reinforced plastic. The membrane may comprise or include a material comprising a non-flexible component or a flexible component. The use of a non-flexible component may be preferred to reliably translate the movement of the movable element into movement of the membrane to effect compression or decompression of the gas volume within the air cushion. The use of a flexible material for the membrane can achieve the longest possible durability of the membrane without defects, especially for long-lasting loads.

In one embodiment, the pulsation generator body is mechanically connected to the air cushion and the movable element is not mechanically connected to the air cushion. With this embodiment, the air cushion arrangement can be realized in such a way that the movable element for transmitting the pulsation to the air cushion is not permanently connected to the air cushion itself, which can be particularly preferred when pressure levels change.

Additionally or alternatively, embodiments can be realized in which, in the installed state of the air cushion arrangement, the pulsation generator is located between the air cushion and the seat surface, so that the pulsation generated by the pulsation generator is emitted in the direction of the seat surface without the pulsation being transmitted through the air cushion. The air cushion can preferably serve as a support surface for the pulsation generator or as a counter-surface for the pulsation generator, which allows variable generation of pulsation depending on the air pressure acting in the air cushion.

In a further development of this embodiment, the movable element is movable relative to the pulsation generator body between a first position and a second position such that the movable element is in abutting contact with the air cushion in the second position and is non-contacting with the air cushion in the first position.

Here, the movable element exerts forces on the air cushion only when moving towards it. When moving in the opposite direction away from the air cushion, no pulling forces are exerted by the movable element on the air cushion cover. This configuration realizes a transmission of pulsation into the air cushion, wherein the stress on the cover of the air cushion can be advantageously reduced.

Alternatively, it may be provided that the pulsation generator body comprises a rigid contact surface on one side of the pulsation generator body which at least partially delimits an interior of the pulsation generator body, wherein the air cushion contacts the contact surface from outside the pulsation generator body and the movable element is arranged in the interior of the pulsation generator body. This embodiment realizes a direct transmission of the pulsation generated by the pulsation generator towards the seat surface of the seat in the installed state of the air cushion arrangement. Hereby, loads on the air cushion can be avoided or reduced in a preferred manner.

In one embodiment, a pulsation generator is assigned to two air cushions and is configured to alternately generate pulsation in the two air cushions. With this embodiment, pulsation can be generated in two or more air cushions using only one pulsation generator, which can advantageously reduce the energy requirement and also the constructional effort. Although in this configuration a fluidic coupling may be provided between the pulsation generator and one of the air cushions, it is provided that at least the other air cushion is mechanically connected to the pulsation generator itself, so that the advantages resulting from the non-fluidic connection of pulsation generator and air cushion are also realized here.

In a further development of this embodiment, it is provided that the pulsation generator is mechanically connected to at least one of the two air cushions via a pressure line such that a movement of the movable element relative to the pulsation generator body can cause pulsation at the at least one of the two air cushions. This embodiment may be particularly preferred if the pulsation generator comprises a pulsation generator body fixedly connected to the one air cushion, wherein the movable element is connected to a membrane or the air cushion cover of the air cushion so that the movement of the movable element changes the volume of the interior of the pulsation generator body. This leads to a change in the pressure conditions in the interior of the pulsation generator body, which is then conducted via the pressure line to the other air cushion and can generate pulsation here. This also allows alternating operation or generation of alternating pulsation in the air cushions in a structurally simpler manner.

Furthermore, there is provided a seat comprising a seat surface, a back surface, a seat interior defined by the seat surface and the back surface, and an air cushion arrangement disposed in the seat interior according to one of the preceding embodiments. The seat thus configured realizes the advantages of the air cushion arrangement in the functionality of the seat.

In particular, it can be provided that the pulsation generator is arranged on a surface of the air cushion facing the seat surface and is configured to generate pulsation in the direction of the seat surface. With this embodiment, the pulsation generated by the pulsation generator is transmitted directly, thus without being passed on through the air cushion, into the seat surface, which can cause the pulsation generated in the pulsation generator to be reliably passed on into the seat surface and thus to the occupant.

Alternatively, it may be provided that the pulsation generator is arranged on a surface of the air cushion facing away from the seat surface and is configured to cause pulsation of the air cushion, and wherein the air cushion is configured to cause pulsation of the seat surface based on the pulsation caused. In this embodiment, the pulsation generated by the pulsation generator is transmitted through the air cushion to the seat surface, which can result in improved seating comfort and simultaneously reduced stress on the pulsation generator, which can have a preferred effect on the service life of the pulsation generator.

DETAILED DESCRIPTION

Figure 1:
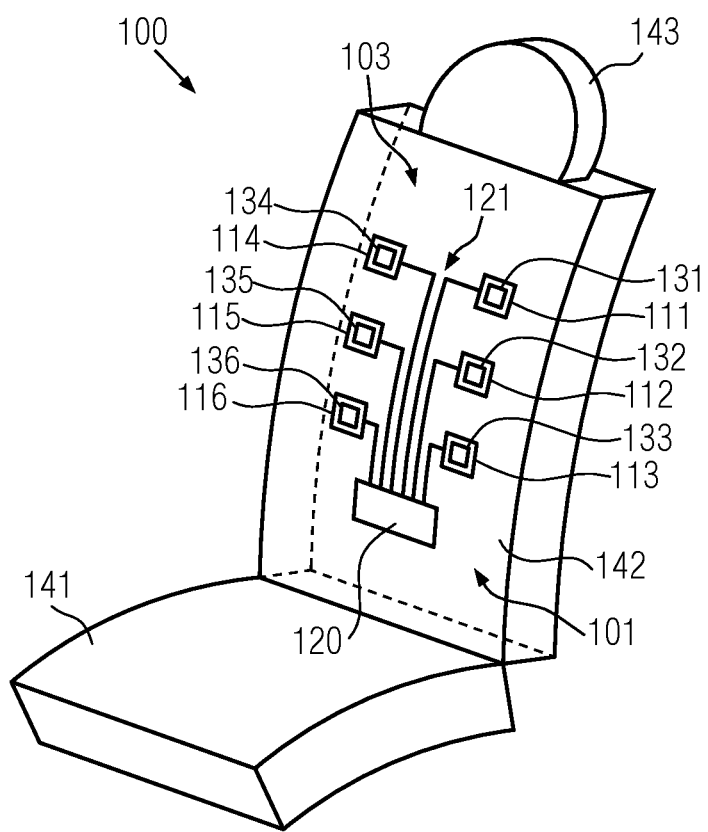
FIG. 1 is a front isometric schematic view showing an exemplary view of a seat with an air cushion arrangement arranged therein.

FIG. 1 shows a seat 100 with an air cushion arrangement 103 according to embodiments of the disclosure.

The seat 100 may include a supporting surface generally referred to as a seat surface, on which, for example, an occupant may sit. As is known, the seat surface comprises a backrest 142 and/or a seating area 141. An occupant can, for example, lean against the backrest with his back, whereas he usually sits on the seating area 141. In addition, the seat may have a headrest 143, for example.

With regard to the configuration of the seat, however, the disclosure is not limited.

According to the disclosure, an air cushion arrangement 103 may be integrated into the seat 100. This air cushion arrangement 103 thereby comprises one, preferably a plurality, of air cushions 111 to 116. For example, the air cushion arrangement may comprise 10, 20, 30 or more air cushions or any number therebetween. The air cushions may be arranged in rows (parallel to each other), as shown herein, or may be provided in some other pattern. The exact arrangement of the air cushions is not limited within the meaning of the disclosure, and may be implemented depending, for example, on the functionality to be achieved by the air cushion arrangement.

The air cushions can, for example, have the same shape but be arranged at different positions within the seat. Basically, the air cushions can be configured as an air cushion cover, the interior of which can be supplied with air, as will be described in the following embodiments, but which is also known in principle from the prior art.

The air cushions can be connected to an air supply system 120 either jointly or independently of one another via one or more lines 121. The air supply system 120 can, for example, have one or more pumps which are configured to supply air, for example from the exterior or the environment, to the air cushions 111 to 116 via the corresponding lines 121. If a single central line is provided which is connected to the individual air cushions via branches, it can be provided that the air cushions are all supplied with air simultaneously. Alternatively, it can be provided that in the individual branches which branch off from the line, lockable and optionally individually controllable valves are arranged which can cause or prevent the supply or removal of air from the individual air cushions.

Alternatively, it can also be provided that at least one of the air cushions is connected to the air supply system via a separate line which is independent of the other lines leading to other air cushions and which, in particular, can comprise a separately controllable shut-off valve. Air can then be selectively supplied to or removed from this air cushion or the air cushions correspondingly connected to the air supply system 120 by a separate line by selectively controlling the valves.

By supplying and extracting air from the air cushions, it is possible, for example, to implement a massage function or a driving assistance function such as a line assist function or a lumbar support. Entertainment functions, such as the accompaniment of music by pressure stimuli transmitted from the air cushions to the occupant, can also be realized with a corresponding air cushion arrangement.

However, the disclosure is not limited with respect to the function effected by the air cushion arrangement.

The air supply system 120 may include an integrated control unit, which is not shown separately here, but is schematically shown as part of the air supply system by the element 120. This control unit may be configured as a microprocessor with associated memory, for example, and may control all of the functions of the air cushion arrangement described herein. Alternatively, it may also be provided that an external control unit (for example, a central vehicle control unit) is used to control the air cushion arrangement 103 or its functions, which may also be configured as comprising a microprocessor and an associated memory. However, the disclosure is also not limited with respect to the configuration of the control unit.

According to the disclosure, a pulsation generator 131 to 136 is assigned to at least one of the air cushions. For example, a pulsation generator can be assigned to each air cushion. However, there are also embodiments included according to which only one of the plurality of air cushions or only a genuine subset of the plurality of air cushions is assigned a pulsation generator in each case.

According to the disclosure, the pulsation generator can generate pulsation in the direction of the seat surface in interaction with the air cushion. According to the disclosure, the pulsation generator is non-fluidically connected to the air cushion assigned to it. This means in particular that a pulsation of the pulsation generator is either mechanically transferred into the air cushion, wherein the air cushion then transfers the pulsation into the seat surface or in the direction of the seat surface, or that the pulsation generated by the pulsation generator is not effected via the air cushion but substantially directly into the seat surface or in the direction of the seat surface. In particular, according to the disclosure, it is provided that the pulsation generator is connected to the air cushion such that the pulsation generated by it is not passed on to the air cushion as pressure information by an air flow in the lines 121 of the air supply system.

In preferred embodiments, the pulsation generator is therefore arranged in close proximity to or in contact with the air cushions, which also includes that only a part of the pulsation generator is in contact with or can come into contact with the air cushion.

Figure 2:
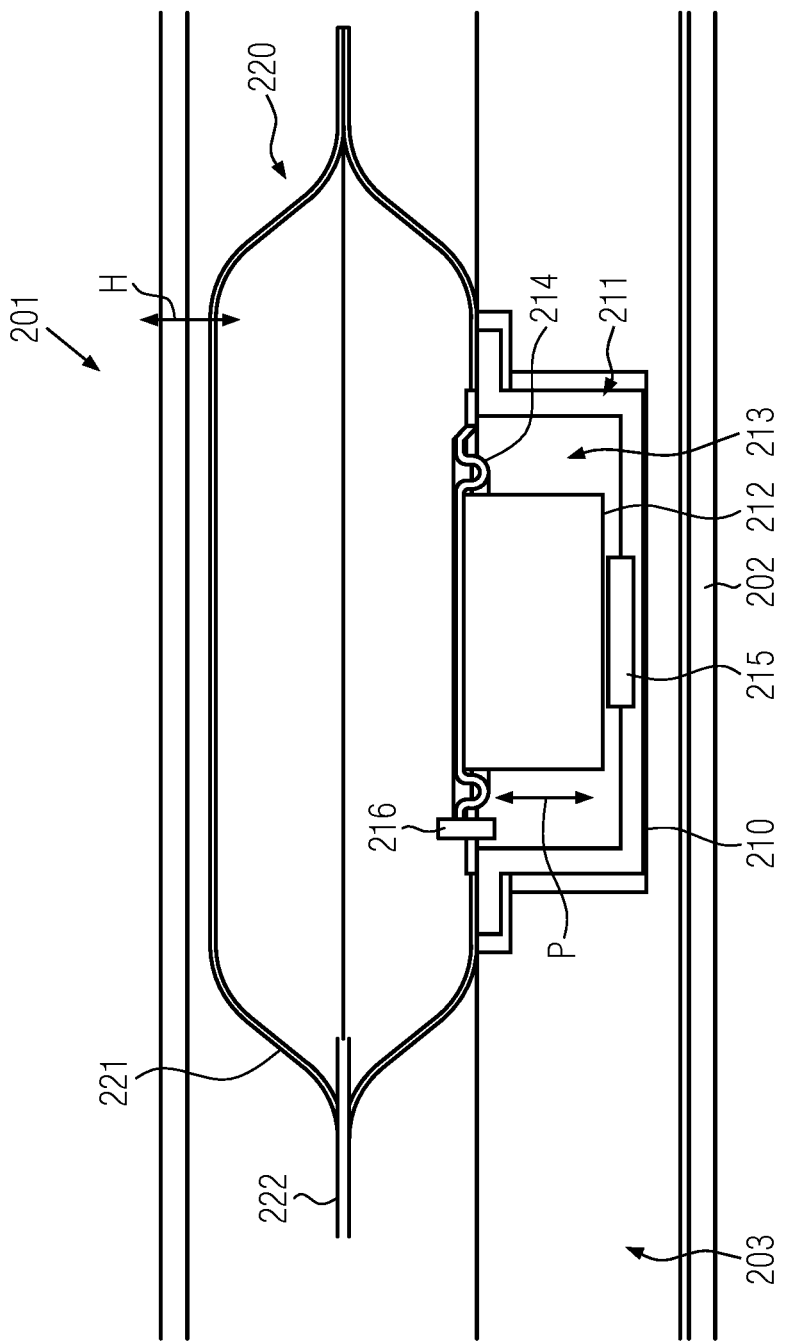
FIG. 2 is a side diagrammatic view showing an embodiment of the air cushion arrangement.

FIG. 2 shows an embodiment of at least one air cushion 220 of the air cushion arrangement together with a pulsation generator 210 assigned to this air cushion 220 in an installed state in a seat. In the embodiment shown here, the air cushion is arranged between a seat surface 201 (for example, the seat 141 or the backrest 142 according to FIG. 1), which comes into contact with an occupant when the occupant is sitting on the seat, and the pulsation generator 210. Thus, the pulsation generator 210 is located further away from the seat surface 201 than the air cushion 220, but closer to the rear side of the seat 202 than the air cushion 220. For example, the pulsation generator 210 may be located wholly or partially within a foam or foam layer 203 of the seat.

The air cushion 220 may be generally understood as a "bubble" bounded by an air cushion cover 221 preferably made of a material that is flexible at least in terms of shape and/or volume. Air can be supplied to the interior of the air cushion 220 via the line 222 shown schematically here via the air supply system (such as the air supply system 120, as described with reference to FIG. 1) or air can be drawn off in order to apply pressure to the air cushion 220 and, for example, to change its shape in order to implement a massage function via same. While the line 222 is guided into the air cushion here in the region of the welded seam of the air cushion, the line 222 can also pass through the air cushion cover at another point on the air cushion. The disclosure is not limited in this regard.

The pulsation module 210 is shown here in an embodiment in which it is mechanically connected to the air cushion 220.

To this end, in this embodiment (but also applicable to the other embodiments described herein), the pulsation generator 210 shown herein comprises a pulsation generator body 211 in which a movable element 212 is arranged. In this regard, the movable element 212 may be arranged in an interior of the pulsation generator 210 that is at least partially bounded by the pulsation generator body 211.

The movable element can be set in motion via an oscillation generator 215 shown here only schematically. The movement of the movable element via the oscillation generator 215 can be generated either mechanically, for example via a suitable (electric) drive motor, or electromagnetically. The oscillation generator can cause the movable element 212 to move in accordance with the double arrow direction p shown, so that the movable element can move toward and away from the air cushion, causing pulsation.

In the latter case, the oscillation generator 215 is configured, for example, as a current-carrying or electrically conductive coil, and the movable element 212 is at least partially magnetic or comprises magnetic parts. For example, the movable element 212 may be configured as comprising a magnetic material or a magnetizable material, such as a metal ring fixedly connected to the air cushion or air cushion cover. Other embodiments, such as in the form of magnetic or magnetizable strips or threads within a portion of the air cushion cover 221 of the air cushion assigned to the pulsation generator body 211, are also conceivable here.

In this embodiment, when current flows through the oscillation generator 215, the forces acting on the movable element 212 thus change, and movement of the movable element toward or away from the air cushion 220 according to the double arrow direction p shown can produce pulsation.

The described embodiment of the pulsation generator is quite general and may also be applied in the other embodiments.

In the embodiment shown here, both the pulsation generator body 211 and the movable element 212 are mechanically connected to the air cushion 220. This can be realized, for example, by welding or screwing or riveting or gluing the pulsation generator body 211 and/or the movable element 212 to the air cushion cover 221 from the outside. Other ways of connecting the pulsation generator body 211 and the movable element 212 are also conceivable here, and the disclosure is not limited in this respect. In particular, the same method of attaching the pulsation generator body to the air cushion cover 221 need not be used to attach the movable element.

In the embodiment shown in FIG. 2, the movable element is connected to a movable or elastic part of the air cushion or air cushion cover (for example, a membrane) that separates the interior 213 of the pulsation generator body 211, in which the movable element 212 is arranged, from the interior of the air cushion 220.

The movable element is mechanically connected to this membrane 214. For example, the movable element 212 can be sewn to this membrane or glued to this membrane from outside the air cushion. The membrane 214 may either be part of the air cushion cover 221 (i.e., in particular be made of the same material) or be formed of another material that is, for example, more elastic than the material of the air cushion cover. In particular, the membrane may comprise silicone, whereas the air cushion cover 221 may be made of or comprise a different material. Preferably, the air cushion cover is formed of or comprises a flexible material so that a change in shape and/or volume of the air cushion cover can be effected depending on the gas pressure or air pressure within the air cushion. The air cushion cover can also comprise a plastic material or, in particular, can be formed as comprising a fiber-reinforced plastic material.

In the embodiment shown here, the movement of the movable element 212 (along the direction p) leads to pulsations that result in a change in volume of the air cushion 221 due to the movement of the membrane 214 following the movement of the movable element. This causes a change in pressure which, starting from the membrane 214, propagates towards the side of the air cushion 220 facing the seat surface 201, where it causes the air cushion cover to move in accordance with the double arrow direction H shown, which in turn causes pulsation in the direction of the seat surface 201 which can be transmitted to the occupant.

Preferably, the generation of pulsation by the pulsation generator 210 may be performed while the air line 222 is shut off from or to the air supply system, so that the change in pressure caused by the change in shape of the air cushion due to the movement of the movable element 212 is transmitted in a change in shape as close as possible to the side of the air cushion 220 facing the seat surface 201 (corresponding to the double arrow direction H).

However, this is not limiting. Thus, the pulsation generated by the pulsation generator 210 in the air cushion 220 may also be superimposed on, for example, a lower frequency supply and discharge of air via the air line 222. It may be preferred if the frequency of the pulsation generated by the pulsation generator is higher, preferably significantly higher, than the frequency at which the air cushion 220 is supplied with air by the air supply system.

For example, the frequency at which the pulsation generator produces pulsation may be five times greater, ten times greater, or twenty times greater, or one hundred times greater than the frequency at which the air supply system supplies air to or discharges air from the air cushion.

In particular, the pulsation generated by the pulsation generator can have a frequency of 1 Hz to 1,000 Hz, whereby a frequency range of 3 Hz to 100 Hz, in particular 60 Hz to 80 Hz or between 5 Hz and 20 Hz, in particular between 5 Hz and 15 Hz and especially preferably between 7 Hz and 12 Hz can be preferred. These frequency ranges have proven to be preferred, especially for the realization of massage functions, since they are perceived as pleasant by the occupant. At the same time, pulsation generators are available at low cost in this frequency range.

These frequency ranges apply equally to all embodiments further described below.

In the embodiment shown, a pressure equalization line 216 may additionally be provided, which connects the interior of the pulsation generator body 210 with the interior of the air cushion 220 assigned to the pulsation generator. Via this pressure equalization line 216, a pressure equalization between the interior of the air cushion and the interior of the pulsation generator or the pulsation generator body can be effected. This is in accordance with the non-fluidic connection between air cushion and pulsation generator provided according to the disclosure, since this non-fluidic connection is provided to effect the pulsation. The pressure equalization via the pressure equalization line does not cause pulsation, but contributes here to a more efficient pulsation realized by the non-fluidic connection of pulsation generator and air cushion.

Preferably, the pressure equalization line 216 can be controlled in a delayed manner with respect to the movement of the movable element in order to realize, after the movable element has caused a pulsation, a pressure equalization between the interior of the air cushion and the interior of the pulsation generator body. For this purpose, the pressure equalization line 216 may optionally include or be formed by a lockable pressure equalization valve.

In this embodiment, the lockable pressure equalization valve or, generally, the pressure equalization line 216 may operate in a delayed manner such that pressure equalization always occurs after the movable element has assumed its extreme position, wherein the extreme position is either the position(s) of the movable element furthest from the center of the air cushion and/or the position(s) of the movable element closest to the center of the air cushion along its amplitude of motion. The delayed effecting of pressure equalization avoids that the pressure change within the air cushion caused by the movable element is immediately equalized via the pressure equalization line 216 with the interior of the pulsation generator body by a pressure change corresponding to the changed internal pressure of the air cushion. This ensures that the pressure change is fully or nearly fully translated into pulsation of the air cushion in the direction of the seat surface.

As an alternative to the controllable configuration of the pressure equalization line and/or the pressure equalization valve, the delay of the pressure equalization can also be effected by a corresponding dimensioning of the pressure equalization line or the pressure equalization valve. In this context, the passage cross-section of the pressure equalization line or of a passage area of the pressure equalization valve can be selected in such a way that the pressure equalization caused by this in the event of a pressure difference prevailing between the interior of the air cushion and the interior in the pulsation generator body during normal operation of the pulsation generator takes place with a delay, thus starting at least offset in time to the pressure change in the interior of the air cushion or in the interior of the pulsation generator body caused by the movement of the movable element. Based on a cyclic movement of the movable element with a frequency f, this can include that the pressure change caused by the pressure equalization line or the pressure equalization valve occurs with the same frequency f, but with a phase offset to the cyclic movement.

Figure 3:
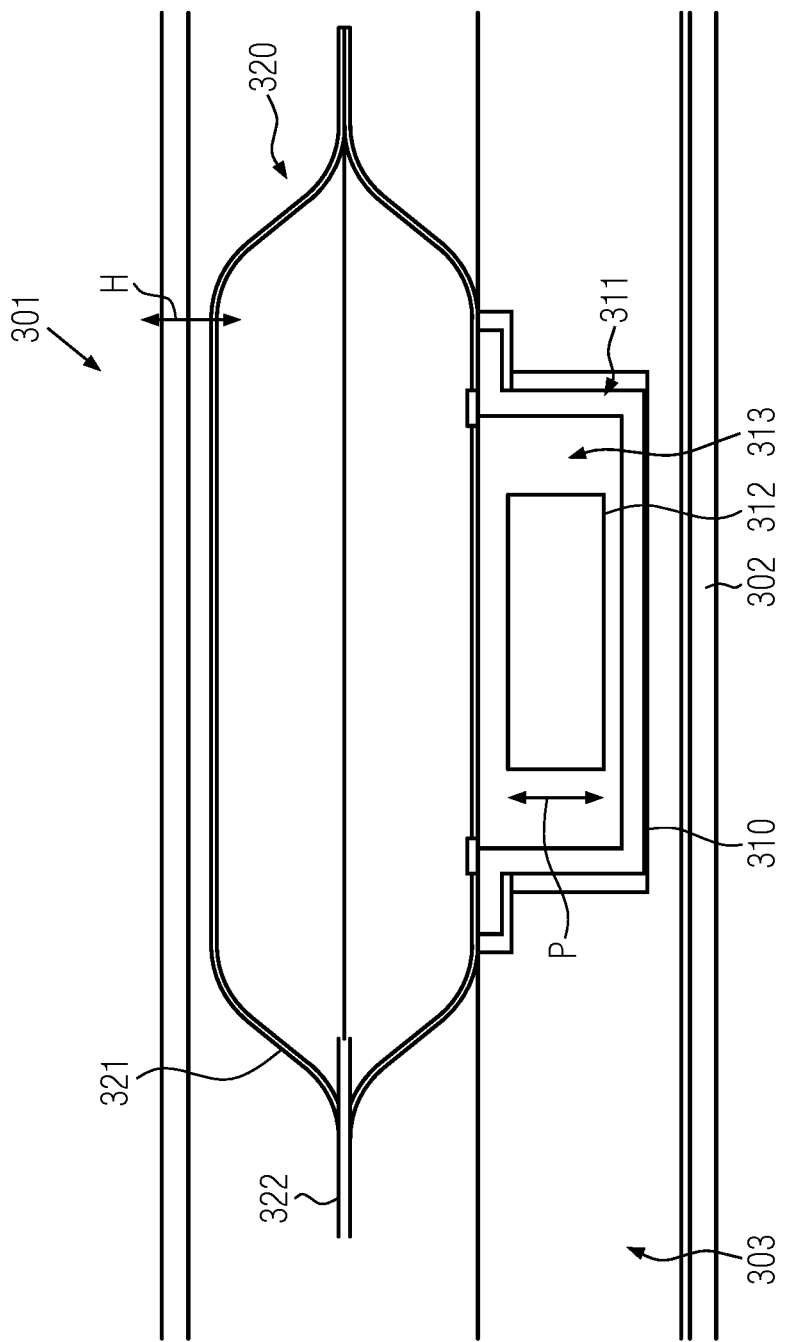
FIG. 3 is a side diagrammatic view showing a further embodiment of the air cushion arrangement.

FIG. 3 shows another embodiment of an air cushion 320 and a pulsation generator 310 assigned to the air cushion 320.

The essential structure of the air cushion and pulsation generator, shown here again between the seat surface 301 and the rear side 302 of the seat in the installed state, corresponds to that of FIG. 2. Here, too, air can be supplied to the air cushion 320 via the air supply system by means of a corresponding air line 322, so that air can be introduced into or removed from the interior within the air cushion cover 321.

In this embodiment, the pulsation generator 310 also comprises a pulsation generator body 311 mechanically connected to the air cushion 320, which together with the air cushion cover 321 encloses an interior 313 of the pulsation generator body 311. In this interior, the movable element 312 is arranged, which can be set in motion via a corresponding oscillation generator (not shown here but configured analogously to FIG. 2) in accordance with the double arrow direction p shown.

In contrast to the embodiment shown in FIG. 2, the movable element 312 in the embodiment shown in FIG. 3 is not fixedly connected to the air cushion 320, but is arranged freely movable with respect thereto within the pulsation generator body 311. In this embodiment, the movement of the movable element can be performed more energetically favorably compared to the embodiment of FIG. 2, since carrying along a part of the air cushion cover 321 when moving the movable element is no longer necessary when the movable element 312 is moved away from the air cushion 320. In this embodiment, it is preferred that no pressure equalization line is provided as shown in FIG. 2, so that there is no pressure equalization between the interior 313 of the pulsation generator body 311 and the interior of the air cushion 320. However, in some embodiments, an appropriate pressure equalization line may also be provided.

Figure 4:
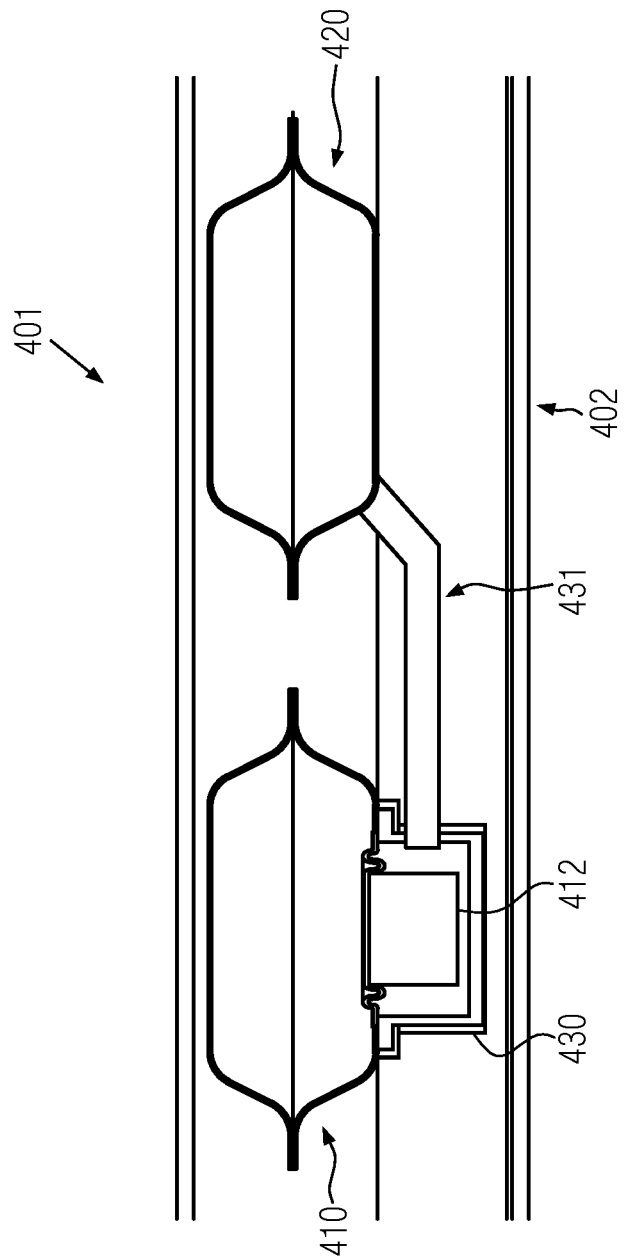
FIG. 4 is a side diagrammatic view showing an embodiment of the air cushion arrangement with a common pulsation generator for two air cushions.

FIG. 4 shows a further embodiment in which a pulsation generator 430 is used to generate pulsation at or in two air cushions 410 and 420. In the embodiment shown here, the pulsation generator can also be implemented according to the embodiments described in FIGS. 2 and 3.

The connection to the air cushion 410 assigned the pulsation generator 430 is thereby preferably implemented according to the embodiments described in connection with FIGS. 2 and 3. In particular, in the embodiment shown here, the movable element 412 may be fixedly connected to a membrane or part of the air cushion cover of the air cushion 410, as described with reference to FIG. 2.

Furthermore, in the embodiment shown here, it is provided that the interior of the pulsation generator 430 is externally connected to the air cover of the second air cushion 420 via a pressure line 431.

If the movable element now moves in the direction of the air cushion 410, the pressure increases in the air cushion 410 and pulsation is caused in the direction of the seat surface 401. At the same time, the interior inside the pulsation generator becomes larger, or the volume enclosed by the membrane or air cushion cover of the air cushion 410 and the pulsation generator body becomes larger. This causes the pressure within the pulsation generator body and also within the pressure line 431 to decrease. This causes the air cushion cover of the air cushion 420 to be pulled toward the pressure line 431, which changes the pressure within the air cushion. Thereby, a pressure change within the air cushion 420 is caused that is opposite to the pressure change in the air cushion 410. If the movable element 412 of the pulsation generator 430 is now moved away from the air cushion 410, the volume of the interior between the membrane and the pulsation generator body of the pulsation generator 430 is reduced accordingly, resulting in a pressure increase also within the pressure line 431. This pressure increase is transferred to the air cushion cover of the air cushion 420 connected to the pressure line 431, resulting in a compression of the air cushion 420 and an accompanying increase in the pressure acting on the seat surface 401.

This causes an alternating pressure change in the air cushions 410 and 420 applied with pulsation by the pulsation generator 430.

In this context, it may be preferred if the pressure line 431 has a cross-sectional area connected to the air cushion 420 which is substantially equal to the area of the membrane or air cushion cover of the air cushion 410 moved by the movable element. In some embodiments, the corresponding cross-sectional area is as large as the area of the membrane or air cushion cover of the air cushion 410 moved by the movable element (which is also intended to include variations of up to 5% or up to 10% of the area compared to the corresponding area of the air cushion cover). There may also be provided embodiments in which the cross-sectional area is only 75% of this size, or only 50% or less.

In particular, it may be provided that the pressure line 431 is pivotally or centrally connected to the air cushion 420 on the side of the air cushion 420 facing away from the seat surface in order to achieve a uniform distribution of the pressure change generated by the pulsation within the air cushion 420.

Figure 5:
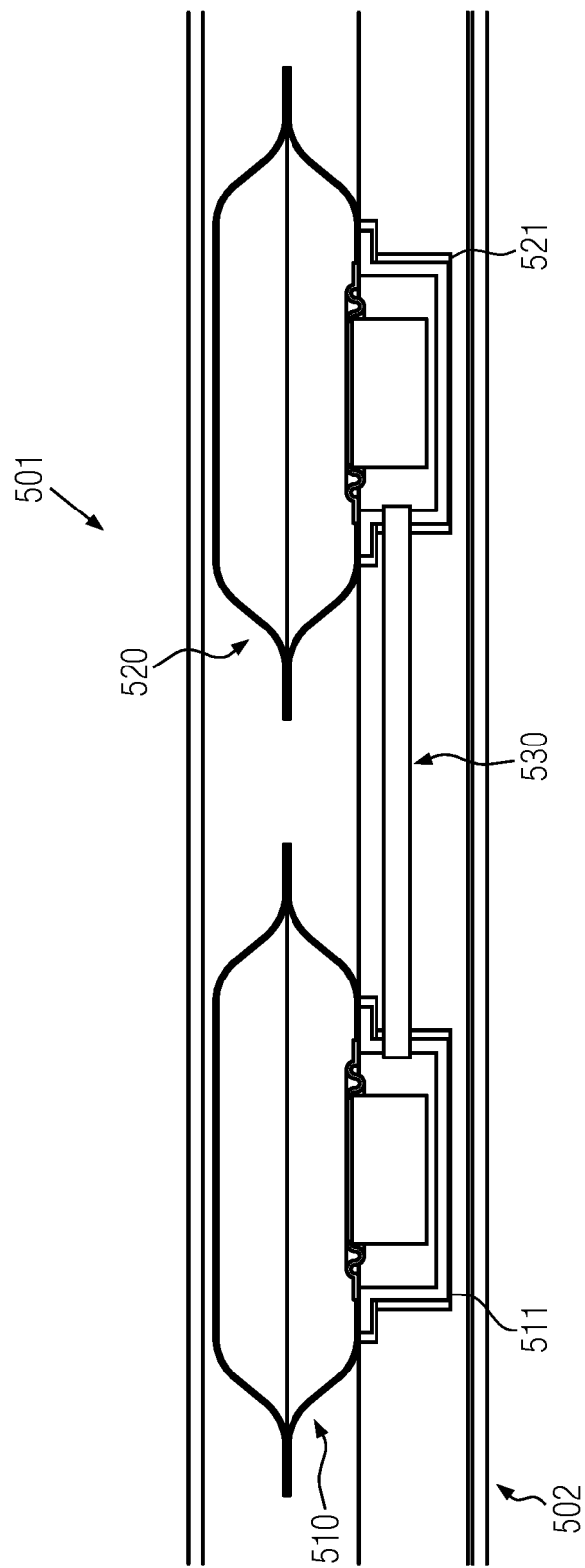
FIG. 5 is a side diagrammatic view showing another embodiment with two fluidically connected pulsation generators.

FIG. 5 shows a further embodiment in which the pulsation generators 511 and 521 assigned to the air cushions 510 and 520 are arranged on the side of the air cushion 510 and 520, respectively, facing away from the seat surface 501. They are thus arranged closer to the rear side of the seat 502 than the respective air cushion 510 or 520.

In the embodiment shown in FIG. 5, two air cushions 510 and 520, respectively, and their respective assigned pulsation generators 511 (assigned to air cushion 510) and 521 (assigned to air cushion 520) are shown.

The pulsation generators and also the connection of the pulsation generators to the air cushions 510 and 520, respectively, can be configured in accordance with the embodiments of FIGS. 2 and 3. Additionally or alternatively, it can also be provided that each of the pulsation generators 511 and 521 or at least one of them is connected to a further air cushion via a corresponding pressure line in order to transmit pulsation to the same. In this sense, the embodiments of FIG. 5 can also be combined with the embodiments of FIG. 4.

In the embodiment shown in FIG. 5, the interiors of the pulsation generators 511 and 521 enclosed by the pulsation generator bodies are fluidly connected via a connection line 530 so that air (or any other gas) can be exchanged between the interiors of the pulsation generators 511 and 521.

This causes a reduction in pressure within the interior of the pulsation generator 521 when the movable element of the pulsation generator 511 is moved in the direction of the air cushion 510. This causes the membrane and/or the air cushion cover of the air cushion 520 to be pulled away from the seat surface 501, as a lower pressure is established within the interior of the pulsation generator 521. This can be preferably used to support movement of the movable element of the pulsation generator 521 away from the seat surface 511 to create a reduction in pressure within the air cushion 520. At the same time, the pressure within the air cushion 510 is increased due to the movement of the movable element of the pulsation generator 511 in the direction of the seat surface 501, so that in this embodiment, an alternating pulsation occurs in the air cushions 510 and 520. This means that an increase in pressure within the air cushion 510 is accompanied by a decrease in pressure within the air cushion 520, and vice versa.

This embodiment can be preferably used to reduce the energy required to generate the pulsation.

In one embodiment, it may further be provided that one oscillation generator is connected to the movable elements of both pulsation generators 511 and 521, so that only exactly one oscillation generator is provided for both pulsation generators 511 and 521. This can be especially preferred in case of a mechanical realization of the movement of the movable elements, since here a counter-rotating movement of the movable elements can be realized by simple mechanical means (such as gear ratios or gears). Hereby, the air cushion arrangement can be configured in a constructively simpler way.

Analogously to the embodiment of FIG. 2, also in the embodiment of FIG. 5 the interior of at least one of the pulsation generators 511 or also 521 can be connected to the interior of one of the air cushions 510 and 520 via a corresponding pressure equalization line. It may also be provided that the interior of each of the pulsation generators 511 and 521 is connected to its respective assigned air cushion 510 and 520, respectively, via a corresponding pressure equalization line. These are not shown separately here for the sake of clarity, however, they can be realized according to the configurations in connection with FIG. 2.

Figure 6:
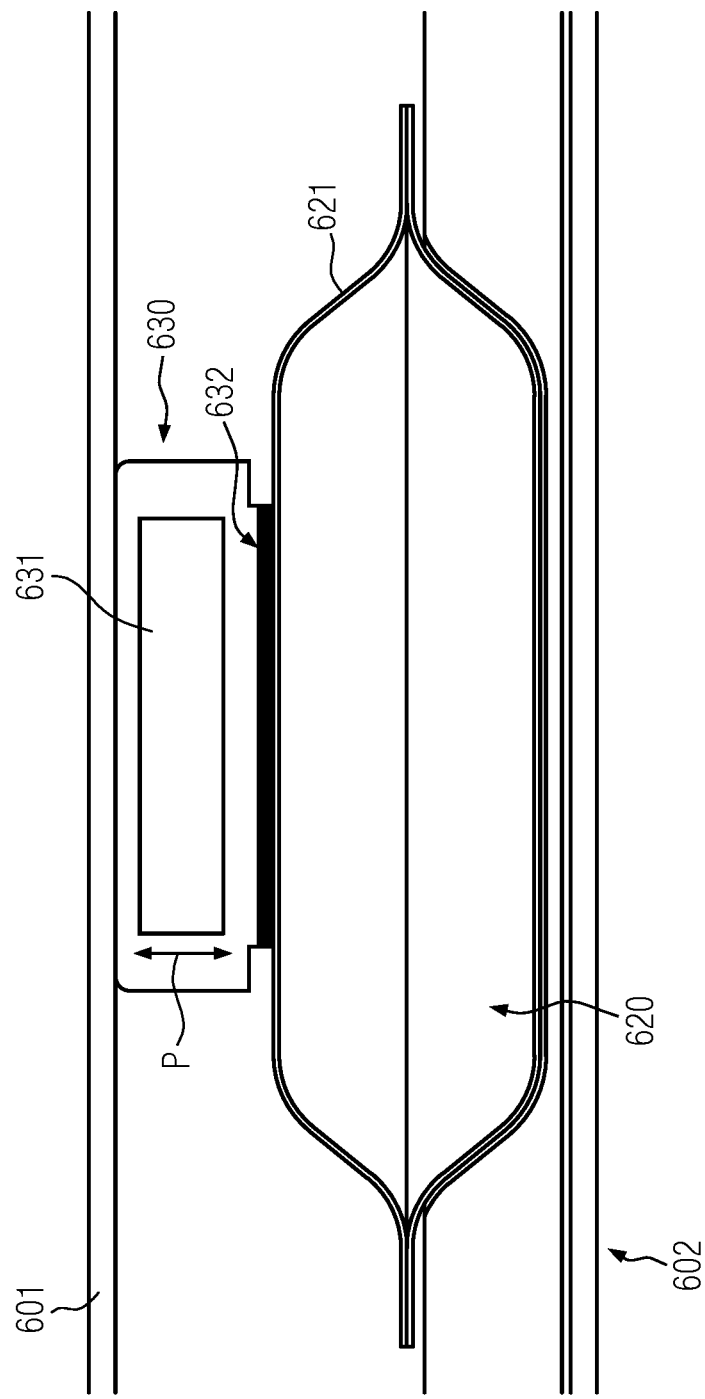
FIG. 6 is a side diagrammatic view showing a further embodiment of the air cushion arrangement.

FIG. 6 shows an alternative configuration to the embodiments of FIGS. 2 to 5, in which the pulsation generator 630 is arranged closer to the seat surface 601 than the air cushion 620, which is correspondingly arranged closer to the rear side 602 of the seat.

In the embodiment shown herein, the pulsation generator 630 or pulsation generator body may include a contact surface 632 which at least partially limits the interior of the pulsation generator 630 or may be considered an outer limiting surface of the pulsation generator 630.

In the embodiment shown here, this contact surface 632 is at least partially in contact with the air cushion cover 621 of the air cushion 620.

In this embodiment, the movable element 631 of the pulsation generator 630 is movably arranged in the interior of the pulsation generator 630 on the side of the contact surface 632 facing away from the air cushion 620, so that no abutting contact of the movable element 631 with the air cushion 620 occurs over the entire movement of the movable element in the direction of the seat surface 601 and away from the seat surface 601.

In this embodiment, the pulsation generated by the movement of the movable element 633 is not transferred into the air cushion 621, but is (directly) directed into the seat surface 601. In this case, the air cushion preferably serves as a counter-pressure surface on which the pulsation generator 630 can at least partially support itself via the contact surface 632, so that the movement of the movable element 631 is preferably completely translated into a pulsation in the direction of the seat surface.

In this context, it may be provided that a movement amplitude of the movable element is controlled depending on the pressure prevailing in the air cushions, for example via a control device assigned to the air cushion arrangement and/or a control device assigned to the pulsation generator. If the pressure within the air cushion 620 is comparatively low, it may be preferred that the amplitude of movement of the movable element 631 is greater. As a result, despite low pressure within the air cushion, a preferably noticeable pulsation is still caused in the direction of the seat surface 601. If the pressure within the air cushion 620 is compara-tively high, the pulsation generator 630 is practically completely supported by the air cushion 620, since a deformation of the air cushion 620 is less easily possible due to the movement of the movable element 631 and a corresponding counter-rotating movement of the pulsation generator body against the internal pressure of the air cushion.

As a result, even if the amplitude of movement of the movable element is comparatively small, the pulsation generated by the movable element is transmitted virtually completely or at least to a larger extent compared to a lower internal pressure of the air cushion 620 in the direction of the seat surface 601. In terms of control, it may therefore be preferred if the amplitude of movement of the movable element 631 is indirectly proportional to the pressure prevailing within the air cushion 620.

In the preceding embodiments, air cushions were described in connection with pulsation generators assigned to them. In this context, it may be provided that different embodiments of those described in FIGS. 2 to 6 are implemented in a single air cushion arrangement. For example, in an area of the seat surface on which the occupant sits, it may be provided that embodiments corresponding to FIGS. 2 to 5 are used, since the counter-pressure on the air cushions caused by the occupant is comparatively high, so that the pulsations can be reliably transmitted in the direction of the seat surface even in the event of conduction losses within the air cushions. Alternatively, configurations corresponding to FIG. 6 can be provided in the backrest of the seat, for example, since the counter-pressure caused by the occupant is lower here, so that direct application of the pulsation generated by the pulsation generator to the seat surface 601 can be preferred in order to bring about pulsation that is sufficiently strong for the occupant. Other combinations are also conceivable here, so that, for example, different embodiments can be implemented within the backrest. With regard to any combinations of embodiments according to FIGS. 2 to 6, the disclosure is therefore not limited.

The invention claimed is:

1. An air cushion arrangement installable in an interior of a seat having a seat surface, the air cushion arrangement comprising:
   at least one air cushion and an air supply system for variably supplying the at least one air cushion with air, wherein at least one air cushion is assigned a pulsation generator, the at least one air cushion being non-fluidically connected to the pulsation generator, wherein the air cushion and the pulsation generator are configured to generate a pulsation in a direction of the seat surface of the seat if the air cushion arrangement were installed in the interior of the seat; and
   wherein the pulsation generator includes a pulsation generator body, a movable element movable relative to the pulsation generator body, and an oscillation generator, wherein the movable element can be moved electromagnetically or mechanically relative to the pulsation generator body by the oscillation generator.

2. The air cushion arrangement according to claim 1, wherein the movable element and the pulsation generator body are each mechanically connected to the air cushion.

3. The air cushion arrangement according to claim 1, wherein an interior of the pulsation generator body in which the movable element is arranged is separated from an interior of the air cushion by a membrane, and wherein the movable element is connected to the membrane.

4. The air cushion arrangement according to claim 3, wherein the air cushion arrangement comprises two of the air cushions and two of the pulsation generators, wherein one pulsation generator is assigned to each respective air cushion, and wherein the interiors of the pulsation generator bodies of the pulsation generators are fluidically connected via a connection line.

5. The air cushion arrangement according to claim 4, wherein the interior of at least one pulsation generator body is connected to the interior of the air cushion assigned to the pulsation generator via a pressure equalization line, and pressure equalization between the interior of the air cushion and the interior of the pulsation generator body can take place via the pressure equalization line, wherein optionally the pressure equalization line includes a lockable pressure equalization.

6. The air cushion arrangement according claim 3, wherein the membrane is an air cushion cover of the air cushion.

7. The air cushion arrangement according to claim 1, wherein the pulsation generator body is mechanically connected to the air cushion and the movable element is not mechanically connected to the air cushion.

8. The air cushion arrangement according to claim 7, wherein the movable element is movable relative to the pulsation generator body between a first position and a second position, such that the movable element is in abutting contact with) the air cushion in the second position and is non-contacting the air cushion in the first position.

9. The air cushion arrangement according to claim 7, wherein the pulsation generator body includes a rigid contact surface on a side of the pulsation generator body that at least partially limits an interior of the pulsation generator body, and wherein the air cushion contacts the contact surface from outside of the pulsation generator body and the movable element is arranged in the interior of the pulsation generator body.

10. The air cushion arrangement according to claim 1, wherein a pulsation generator is assigned to two of the air cushions and is adapted to alternately generate a pulsation in the two air cushions.

11. The air cushion arrangement according to claim 10, wherein the pulsation generator is mechanically connected to at least one of the two air cushions via a pressure line such that a movement of the movable element relative to the pulsation generator body can cause a pulsation at the at least one of the two air cushions.

12. A seat comprising a seat surface, a back surface, a seat interior defined by the seat surface and the back surface, and an air cushion arrangement disposed in the seat interior according to claim 1.

13. The seat according to claim 12, wherein the pulsation generator is arranged on a surface of the air cushion facing the seat surface and is configured to generate pulsation in the direction of the seat surface.

14. The seat according to claim 12, wherein the pulsation generator is arranged on a surface of the air cushion facing away from the seat surface and is configured to cause pulsation of the air cushion, and wherein the air cushion is configured to cause pulsation of the seat surface based on the pulsation caused in the air cushion.

\* \* \* \* \*